United States Patent Office 3,408,557
Patented Oct. 29, 1968

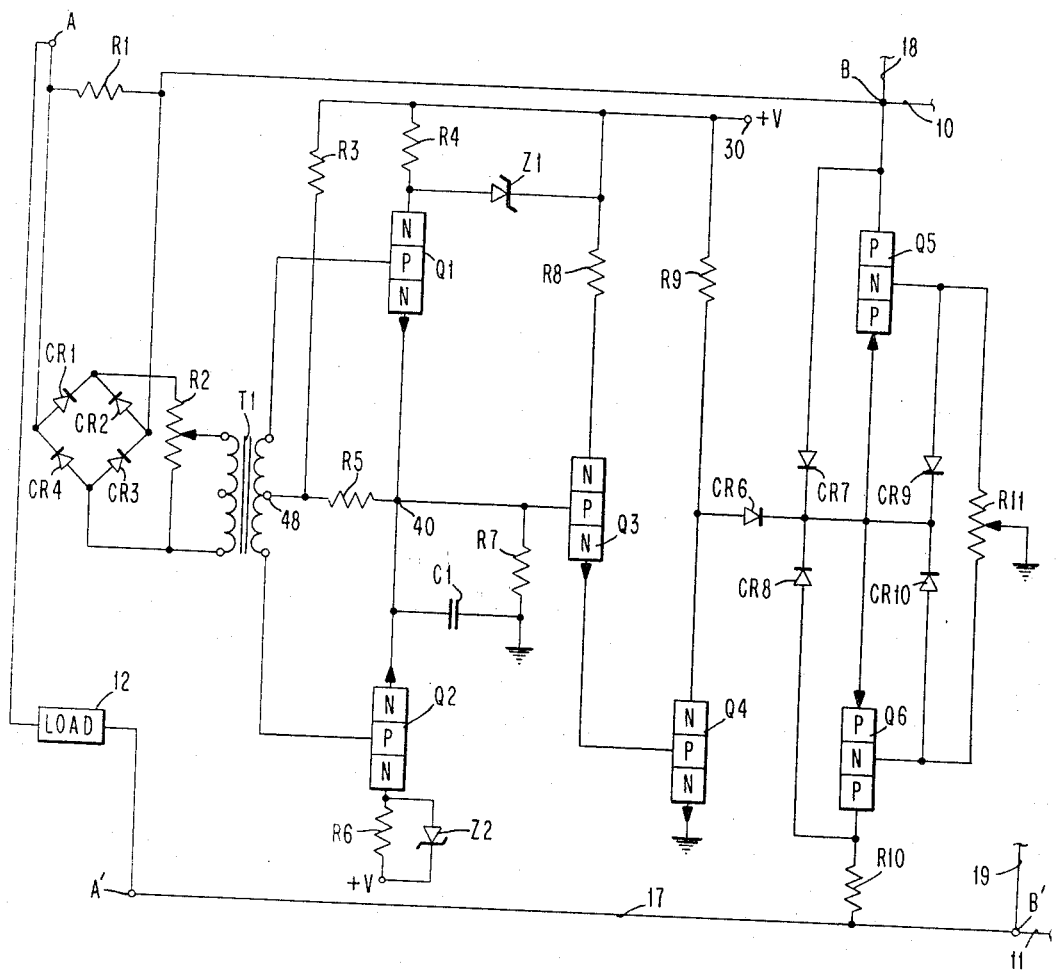

3,408,557
CONSTANT SOURCE CURRENT
REGULATING SYSTEM
Thomas B. Horgan, Endwell, N.Y., and Richard A. Stanley, Trumbull, Conn., assignors to International Business Machines Corporation, Armonk, N.Y., a corporation of New York
Filed Dec. 9, 1965, Ser. No. 512,729
6 Claims. (Cl. 323—1)

ABSTRACT OF THE DISCLOSURE

A regulating circuit provides a shunt circuit path which is so controlled that the total current from the source remains constant regardless of variation in one or more load currents, as well as variation in source voltage and load parameters.

---

This invention relates generally to regulators and it has reference in particular to regulators for alternating current systems.

Generally stated, it is an object of this invention to provide a simple and effective regulator particularly for alternating current systems.

More specifically, it is an object of this invention to provide for regulating the current in an alternating current circuit directly, by providing a variable shunt load which is varied to prevent current fluctuations of one load from adversely affecting the performance of other loads connected to the same source.

One object of the present invention is to use an alternating current load signal to control the effective impedance of a shunt circuit in accordance with the load current so as to vary the current in the shunt circuit inversely with the load current.

Yet another object of the invention is to provide a backward-looking regulator which responds to variations in current of one load to maintain the current drawn by the load from a source at a constant level, thereby minimizing the effects on other loads of variations in the current of the one load.

Another object of this invention is to provide a current regulator which stabilizes the current drawn from a source while permitting peak excursions of the current supplied to a load.

In practicing the invention in accordance with one of its embodiments, a load current responsive voltage from an alternating current load circuit is used to develop an error signal across an R-C circuit. This signal controls the base current of an amplifier controlling a shunt regulating circuit, so that as the current responsive voltage exceeds a reference level, the current in the shunt regulating circuit is correspondingly reduced, to maintain the total current drawn by the circuit from a source at a constant level.

The foregoing and other objects, features, and advantages of the invention will be apparent from the following more particular description of the invention as illustrated in the accompanying drawing.

In the drawing, the single figure is a schematic diagram of a regulating system embodying the invention in a preferred form.

Referring to the single figure the numerals 10 and 11 designate conductors for connecting a load device 12 to a source of alternating current (not shown). The conductors 10 and 11 may be connected to terminals B and B', respectively, from which conductors BA and B'A' connect the source to the load device 12, while branch conductors 18 and 19 are representative of conductors supplying one or more additional load devices from the same source.

In order to regulate the current drawn from the source, a pair of transistors Q5 and Q6 are connected between the conductors BA and B'A' adjacent the source to control the current through a regulating resistor R10. The transistors Q5 and Q6 are of the PNP type and are connected in opposed relation, diodes CR8 and CR7 being associated therewith for providing paths through the transistors Q5 and Q6 on opposite half cycles of the alternating current source, respectively. The conductivity of the transistors Q5 and Q6 is established by base current supplied thereto from the positive terminal 30 of a direct current source through resistor R9, diode CR6, and an adjustable voltage divider R11 which is connected to ground. This base current is controlled by means of a transistor Q4 which provides a variable shunt between the junction point of the resistor R9 and the diode CR6 to ground. The conductivity of transistor Q4 is in turn controlled by a transistor Q3, the base of which is connected to ground through a resistor R7 and also to the midpoint 40 between two transistors Q1 and Q2, which are connected through resistors R5 and R6, respectively, to the positive terminal 30 of the direct current bias source in a push-pull arrangement. The bases of these transistors are connected to the secondary terminals of a transformer T1 having a center tap 48 connected to the terminal 30 through a bias resistor R3 and connected to the midpoint 40 by means of a resistor R5. The primary winding of the transformer T1 is connected by means of a potentiometer R2 to a bridge circuit of rectifier devices CR1–CR4, comprising a full wave bridge rectifier connected across a resistor R1 in series circuit relation with the conductor BA and the load device 12 so as to produce a voltage responsive to the current drawn by the load device.

It will be seen that the current in the load circuit is sampled by the series resistor R1 and the voltage developed thereacross is doubled in frequency by being rectified and applied to the primary winding of the transformer T1 through the potentiometer R2. The voltage developed in the secondary winding of the transformer T1 is applied through the push-pull arrangement transistors Q1 and Q2 to bias resistor R7 which, in conjunction with a capacitor C1, provides a filtered D.C. voltage for controlling the conductivity of the transistor Q3. The potentiometer R2 is adjusted so that Zener diodes Z1 and Z2 clip the peaks of the alternating current signal at the collectors of the transistors Q1 and Q2 when the alternating load current is at a minimum, so as to prevent saturation of Q1 and Q2 and establish a reference level.

The error signal produced across the resistor R7 is related to the magnitude by which the input signal exceeds the preset clipping level on the transistors Q1 and Q2. As the load current increases, this error signal increases. The capacitor C1 provides a filtering action so as to produce a more stable direct current level at the base of transistor Q3. As the error signal increases, the transistors Q3 and Q4 draw more collector current, thus shunting the base current away from the transistors Q5 and Q6, and thus reducing the current drawn from the alternating current circuit through the resistor R10. This action compensates for the increased load current in R1 and maintains the input current to the terminals B and B' at a substantially constant level.

Each of the transistors Q5 and Q6 conducts on alternating half cycles through the path provided by the resistor R10 and the diodes CR8 and CR7, respectively. Diodes CR9 and CR10 connected between the base and emitters of the transistors Q5 and Q6 provide reference bias protection for the transistors and improve the wave-form of the shunt load current at the cross-over point. The voltage divider R11 provides for balancing the base drives of the transistors Q5 and Q6 so as to permit a much wider disparity between their $V_{BE}$'s than could be normally tolerated.

A circuit as hereinbefore described has been built and tested for operation with a nominal 2-ampere load on a 13-volt, 60-cycle alternating current line. The maximum load variation amounted to ±.4 amperes. The following component values were utilized:

Parts list

| | |
|---|---|
| $C_1$ | 5.6 µf., 15 volts. |
| $CR_1$–$CR_4$ | IBM Type AA. |
| $CR_5(Z_1)$ | IBM Type BL$_s$. |
| $CR_6$ | IBM Type AA. |
| $CR_7$, $CR_8$ | IBM Type AM. |
| $CR_9$, $CR_{10}$ | IBM Type AA. |
| $Q_1$, $Q_2$ | IBM Type 256. |
| $Q_3$ | IBM Type 099. |
| $Q_4$ | IBM Type 194. |
| $Q_5$, $Q_6$ | IBM Type 0.22. |
| $R_1$ | 0.5 ohm, 5 watts. |
| $R_2$ | 500 ohms pot. |
| $R_3$ | 200K, ¼ watt. |
| $R_4$, $R_6$ | 16K, ¼ watt. |
| $R_5$ | 43K, ¼ watt. |
| $R_7$ | 500 ohms, ¼ watt. |
| $R_8$ | 1.8K, ¼ watt. |
| $R_9$ | 100 ohms, ¼ watt. |
| $R_{10}$ | 17 ohms, 30 watts. |
| $R_{11}$ | 2K pot. |
| $T_1$ | Stancor PCT-39. |
| $V_{cc}(+V)$ | 6 volts. |

A regulating circuit embodying the invention has several advantages over the prior art. It can regulate the current drawn from an alternating current circuit directly without requiring a conversion to direct current, or the use of mechanical equipment. By adjusting R2 so that the current drawn from the source is stabilized at the maximum value of the load current, regulation is obtained above and below this level. If desired, a value for the current from the source greater than the maximum load current may be set; but regulation will not occur for excursions above this threshold.

Being completely transistorized, the device is physically small; it is also relatively inexpensive compared to other methods of regulation. In addition, a regulating system embodying the invention does not prevent the load device from drawing sharp current surges as does the usual current limiting circuit. Such surges are often essential to the proper operation of circuits and machine timing in equipment, and their elimination could not be tolerated without affecting operation of the equipment.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a regulating circuit for a load disposed to be connected to an alternating current source of electrical energy,
    means including a bridge circuit and a transformer for producing a double frequency current responsive to the load and source voltage connected in circuit with the load and source for producing a voltage proportional to the load current,
    variable impedance means connected in shunt with the load, and
    circuit means connecting the variable impedance means and the voltage producing means to vary the current in the variable impedance means inversely with variations in the load current to maintain the total current from the source constant.

2. A regulating circuit in accordance with the combination defined in claim 1 characterized by:
    the variable impedance means comprising an impedance device connected in shunt with the load by a pair of oppositely disposed controllable semiconductor devices.

3. A regulating circuit in accordance with the combination defined in claim 1 characterized by:
    the circuit means connecting the voltage producing means and the variable impedance means comprising a pair of semiconductor devices connected in a push-pull amplifier configuration, and
    a Zener diode connected in shunt relation with a collector resistor of each of the semiconductor devices to prevent the devices from reaching the saturation level.

4. A regulating circuit in accordance with the combination of claim 3, characterized by the oppositely disposed semiconductor devices each being shunted by diode means poled in the opposite sense.

5. A regulating circuit in accordance with the combination of claim 4 characterized by:
    the semiconductor devices being transistors, and having additional diode means connected base-to-emitter to provide base bias.

6. A regulating circuit in accordance with the combination defined in claim 5 characterized by:
    the push-pull amplifier producing an error voltage which is averaged by an R-C circuit and applied to a transistor connected to reduce the base bias of the oppositely disposed semiconductor devices of the variable impedance device to increase the effective impedance thereof as the load current increases.

References Cited

UNITED STATES PATENTS

| | | | |
|---|---|---|---|
| 1,487,108 | 3/1924 | Knoop | 323—22 X |
| 2,816,261 | 12/1957 | Preisig | 323—22 X |
| 2,906,941 | 9/1959 | Brolin | 323—22 |
| 2,956,172 | 10/1960 | Torkildsen | 323—22 X |
| 3,088,067 | 4/1963 | Sender | 323—22 |

LEE T. HIX, *Primary Examiner.*

A. D. PELLINEN, *Assistant Examiner.*